(12) United States Patent
Merritt

(10) Patent No.: US 7,121,101 B2
(45) Date of Patent: Oct. 17, 2006

(54) MULTIPURPOSE ADIABATIC POTABLE WATER PRODUCTION APPARATUS AND METHOD

(76) Inventor: Thomas D. Merritt, 2027 Thomas St., Hollywood, FL (US) 33020

( * ) Notice: Subject to any disclaimer, the term of this patent is extended or adjusted under 35 U.S.C. 154(b) by 0 days.

(21) Appl. No.: 10/857,648

(22) Filed: May 28, 2004

(65) Prior Publication Data

US 2005/0262854 A1    Dec. 1, 2005

(51) Int. Cl.
*F25D 17/06*    (2006.01)
(52) U.S. Cl. ............................................. 62/93; 62/285
(58) Field of Classification Search ............... 62/93, 62/271, 272, 285, 288, 291; 210/137
See application file for complete search history.

(56) References Cited

U.S. PATENT DOCUMENTS

| | | | | |
|---|---|---|---|---|
| 3,675,442 A | * | 7/1972 | Swanson | 62/285 |
| 4,080,186 A | * | 3/1978 | Ockert | 55/438 |
| 4,182,132 A | * | 1/1980 | Nasser et al. | 62/93 |
| 4,313,312 A | * | 2/1982 | Ito et al. | 62/271 |
| 4,315,599 A | * | 2/1982 | Biancardi | 239/10 |
| 4,433,552 A | * | 2/1984 | Smith | 62/93 |
| 4,726,817 A | * | 2/1988 | Roger | 95/115 |
| 5,250,091 A | * | 10/1993 | Nigsch et al. | 55/490.2 |
| 5,517,829 A | * | 5/1996 | Michael | 62/272 |
| 5,553,459 A | * | 9/1996 | Harrison | 62/93 |
| 5,601,236 A | * | 2/1997 | Wold | 239/63 |
| 6,574,979 B1 | * | 6/2003 | Faqih | 62/285 |
| 6,868,690 B1 | * | 3/2005 | Faqih | 62/291 |

FOREIGN PATENT DOCUMENTS

| | | | |
|---|---|---|---|
| JP | 7-275642 A | * | 4/1994 |
| JP | 408005206 A | * | 1/1996 |

* cited by examiner

*Primary Examiner*—Mohammad M. Ali

(57) ABSTRACT

Apparatus and methods for transforming water vapor into potable water by using a vapor compression refrigeration system which includes first and second cooling elements disposed in a closed loop air passage duct that provides a continuous air circulation pattern driven by a fan or similar device. Water is introduced into the circulating air and undergoes adiabatic cooling followed by two stage cooling, first at a temperature below the dew point and then at a lower temperature at or below freezing. Water is collected from the air in each step and the air is thereafter heated back up by the condensing element of the refrigeration system enabling it to absorb more water vapor at the point of introduction. The air is recirculated and processed as above to permit cyclical water recovery.

21 Claims, 5 Drawing Sheets

Fig. 1

MULTIPURPOSE ADIABATIC POTABLE WATER PRODUCTION APPARATUS AND METHOD

BACKGROUND OF THE INVENTION

The present invention relates to an improved apparatus for transforming atmospheric water vapor, or non-potable water vapor vaporized into air, into potable water, and particularly for obtaining drinking quality water through the formation of condensed water vapor upon one or more surfaces which are maintained at a temperature at or below the dew point for a given ambient condition. The surfaces upon which the water vapor is condensed are kept below the dew point by means of a refrigerant medium circulating through a closed fluid path, which includes refrigerant evaporation apparatus, thereby providing cooling of a bypassing airstream, and refrigerant condensing apparatus for providing heat to the airstream.

U.S. Pat. No. 5,301,516—Poindexter and U.S. Pat. Nos. 5,106,512 and 5,149,446—Reidy each disclose potable water collection apparatus comprising refrigeration apparatus to maintain a cooling coil at a temperature below the dew point to cause condensed water to form. Other prior art examples include U.S. Pat. No. 5,669,221—Le Bleu and Forsberg, wherein collected water or municipal water is simply filtered repeatedly until a desired potable quality exists. Other prior art examples for converting water vapor into liquid potable water exist within the public domain. U.S. Pat. No. 6,343,479—Merritt also discloses such techniques.

However, much of the above mentioned prior art is limited in scope to performing air to water conversion, thereby exhibiting an undesirable shortcoming. The prior art typically exhibits an inability to efficiently convert into water any quantity near the total amount of water vapor actually present in the atmosphere in the vicinity of surfaces maintained at temperatures below the dew point. The novel water production systems and methods disclosed herein are further capable of performing multiple functions such as water purification, desalination and distillation, as well as the task of converting moist air to water. The systems and methods disclosed herein will provide multiple functions at a substantial increase in efficiency with respect to the conventional techniques used for these functions, thereby overcoming shortcomings of the prior art and providing a much sought after solution to water quality problems which exist worldwide.

SUMMARY OF THE INVENTION

It is an object of the present invention to provide novel means and methods for condensing and collecting water for drinking purposes from the atmosphere. It is a further object of the invention to provide means to purify water not yet fit for human consumption, thereby rendering the water safe to drink. It is yet a further object of the present invention to provide means and methods to distill ordinary water at relatively low ambient temperatures, thereby substantially reducing the energy costs normally associated with this task. These and other objects are fulfilled by employing sophisticated refrigeration techniques including multiple evaporators, adiabatic cooling techniques, reheat, as well as a novel defrost mechanism, all operating within an enclosed ducted air passageway. These techniques allow the apparatus to capture relatively large quantities of water, up to the greatest quantity of moisture per unit volume of air possible under a variety of conditions and situations. Upon determining whether the apparatus is to function as a simple air to water conversion device, a water distillation device, or desalination device, controls relevant to each separate operation may be activated in accordance with the present invention.

In accordance with one aspect of the invention, a method and apparatus for providing low temperature water distillation is as follows. A fan forces air through an enclosed air passage duct which is formed to allow for a continuous circulation pattern. The enclosed air duct or passageway preferably is insulated from exterior ambient temperature conditions. Water is introduced into the circulating air in the form of a fine mist which has an immediate effect known as adiabatic cooling. In this case, the adiabatic process is evaporative cooling. As the water vapor is absorbed into the air, energy is transformed from sensible heat into latent heat of vaporization. Accordingly, the temperature of the air falls, and its absolute humidity rises, while the overall energy content remains the same. The vapor laden air is then driven by the fan and passed across at least one surface of a first air stream cooling element which is maintained at a temperature below the dew point. The first cooling element causes a portion of the vapor in the air to convert into liquid water. As the air passes the first cooling element, it is cooled to reach one hundred percent relative humidity. The air stream is then passed across the surface of a second air stream cooling element. The second cooling element is operated at a temperature below the freezing point of water so that a very substantial percentage of the remaining water within the air stream is captured at the second cooling element. As the air stream passes beyond the second cooling element, it is again at one hundred percent relative humidity, though at a much cooler temperature. The air stream is then passed across an air stream heating element where the temperature of the air is drastically increased, simultaneously resulting in a significant drop in relative humidity. The air then returns through the insulated, enclosed ducted air passageway to the region of the backside of the fan which forces the air through the cycle again. At the same time that the airstream passes around the enclosed passageway in, for example, a counterclockwise direction, a refrigerant is passed around the corresponding loop of refrigerant elements in the opposite direction and the operating conditions associated with the refrigerant are controlled at each element to effect the desired temperature and pressure conditions.

This arrangement of adiabatic cooling, first and second cooling means, and air reheat, results in the capture of the greatest quantity of water possible in comparison to conventional techniques used for such tasks. Further, the task is accomplished with a significant decrease in energy usage, thereby resulting in higher efficiencies. An adjustable air damper may be positioned in the ducted passageway to control the inlet and exhaust of air into and out of the closed loop, this being determined by the particular function of the device, ambient conditions such as temperature and relative humidity, and pressures within the refrigerant circulating mechanism which control the temperature of the cooling and heating means. In the above described operation the damper is normally closed, completely isolating the air circuit from exterior ambient conditions. The water formed upon the cooled surfaces is collected and subjected, for example, to a germicidal lamp, then filtered through activated carbon to produce potable water as is known in other systems.

The foregoing and other aspects of the present invention will be described below, referring to the drawings.

DETAILED DESCRIPTION OF THE INVENTION

Figure 1:
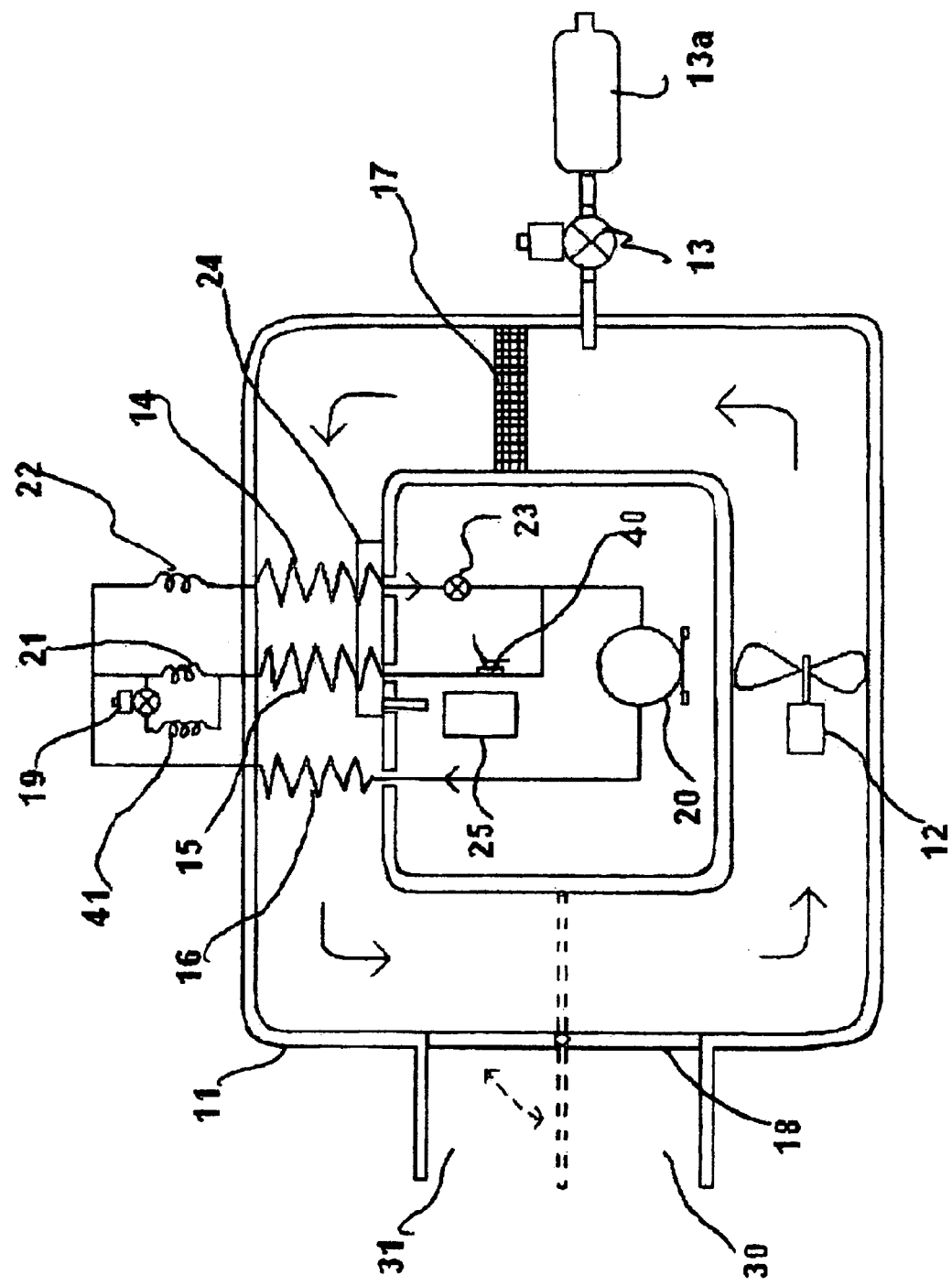
FIG. 1 is a schematic representation of a preferred embodiment of the present invention illustrating operational elements and their relative positions.

Referring to FIG. 1, major components of the invention are positioned within a fully enclosed loop air passage duct 11. In a preferred embodiment, duct 11 is insulated from ambient atmospheric conditions. A continuous flow of air containing water vapor (humidity), or into which moisture is injected (see below), is circulated through the closed loop air passage duct 11 by air movement means 12 such as a motor driven fan in, for example, a counterclockwise direction. A sequence of refrigeration components 14, 15, 16 is positioned within the duct 11 in ascending numerical order downstream from fan 12. These refrigeration components comprise a first air stream cooling element 14 such as a first refrigerant evaporator having an exterior surface, a second air stream cooling element 15 such as a second refrigerant evaporator having an exterior surface, and an air stream heating element 16, which in the preferred embodiment is a condenser of the refrigeration system. The refrigeration system further comprises a compressor 20 and first, second and third metering devices 21, 41, and 22, respectively. Refrigerant is supplied from compressor 20 to the several heating, cooling and control elements noted above. The state of the refrigerant medium is controllably altered to provide the desired temperature/pressure parameters around the loop. A suction pressure regulator 23 is provided which acts in concert with metering device 22 to cause the first cooling element 14 to operate at a selected pressure corresponding to a temperature below the dew point of the air being forced across the surface of cooling element 14. At least a portion of the water vapor within the air moving across the surface of the first cooling element 14 condenses into liquid, thereby causing the passing air to cool (drop in temperature) while the humidity rises to 100%. The condensed liquid water is collected in a pan 24 and is passed to a storage vessel 25. The second cooling element 15 is operated at a pressure corresponding to a temperature below the dew point of the air exiting the first cooling element 14 by controlling first metering device 21. Preferably, second cooling element 15 is operated at a temperature below the freezing point of water so that substantially all or a large percentage of the remaining water (vapor) in the air stream is captured at the second cooling element 15.

Figure 3:
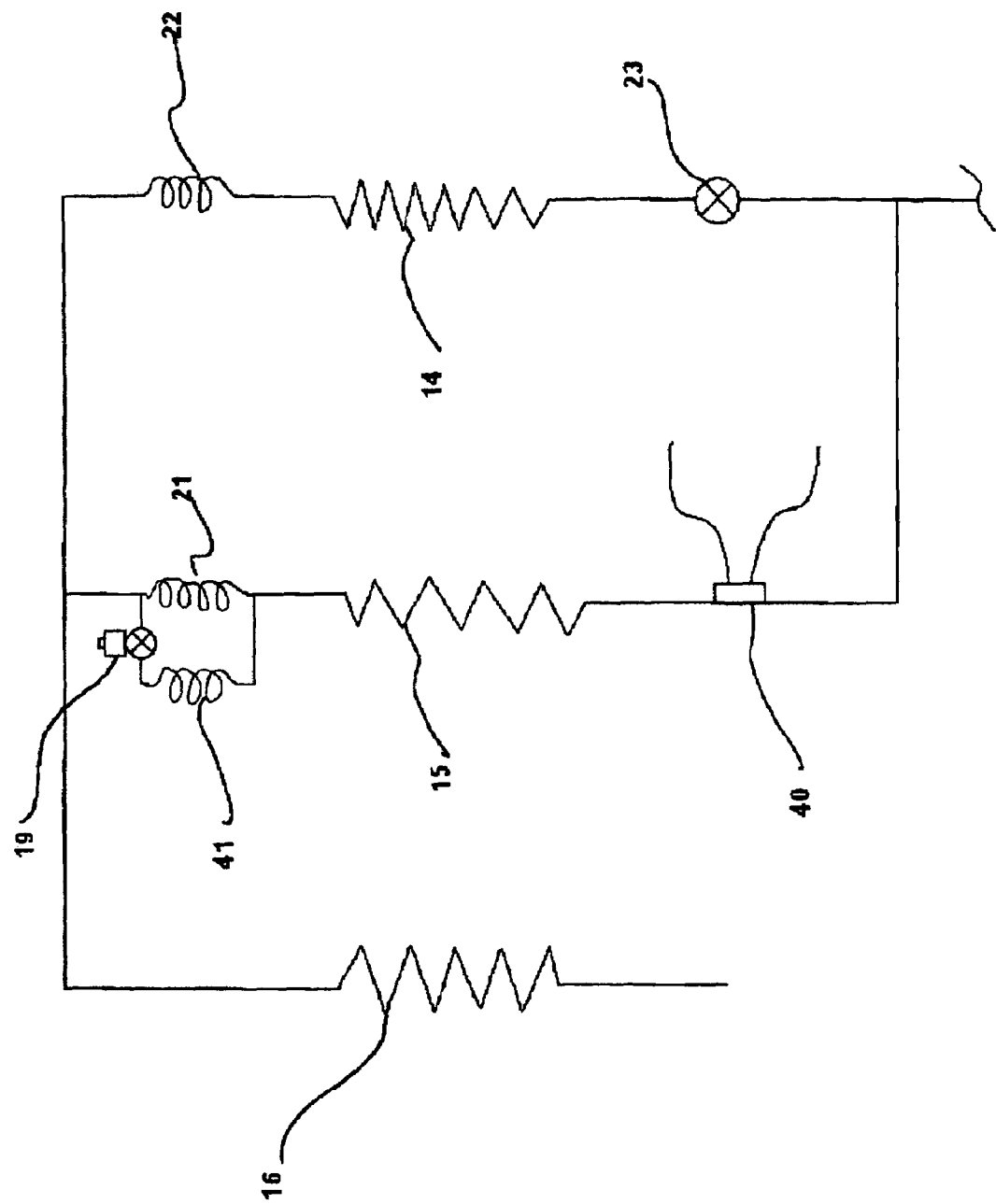
FIG. 3 is schematic illustration of a section of an embodiment of the invention with particular reference to components which control temperatures of first and second cooling elements.

Referring to FIG. 3, metering devices 21 and 41 as well as metering device 22 are illustrated as capillary tubing. Controlling this type of metering device consists of determining the correct ratio between the length of the tubing and inside diameter of the tubing. Extremely accurate pressure and temperature relationships are attainable using this dimensioning technique. Other types of metering devices can be used instead. The preferred operating temperature of second cooling element 15 is below the freezing temperature of water. In fact, temperatures down to 0° Fahrenheit (F) are not undesirable for second cooling element 15. It should be understood that first cooling element 14 and second cooling element 15 may be combined within a single physical structure, thereby creating a multiple temperature refrigeration evaporator element, as well as reducing the part count. A damper 18 is positioned preferably between heating element 16 and fan 12. Damper 18, when opened, creates an inlet port 30 and an outlet port 31 which are useful during certain tasks performed by the apparatus, such as simple atmospheric air to water conversion.

Figure 2:
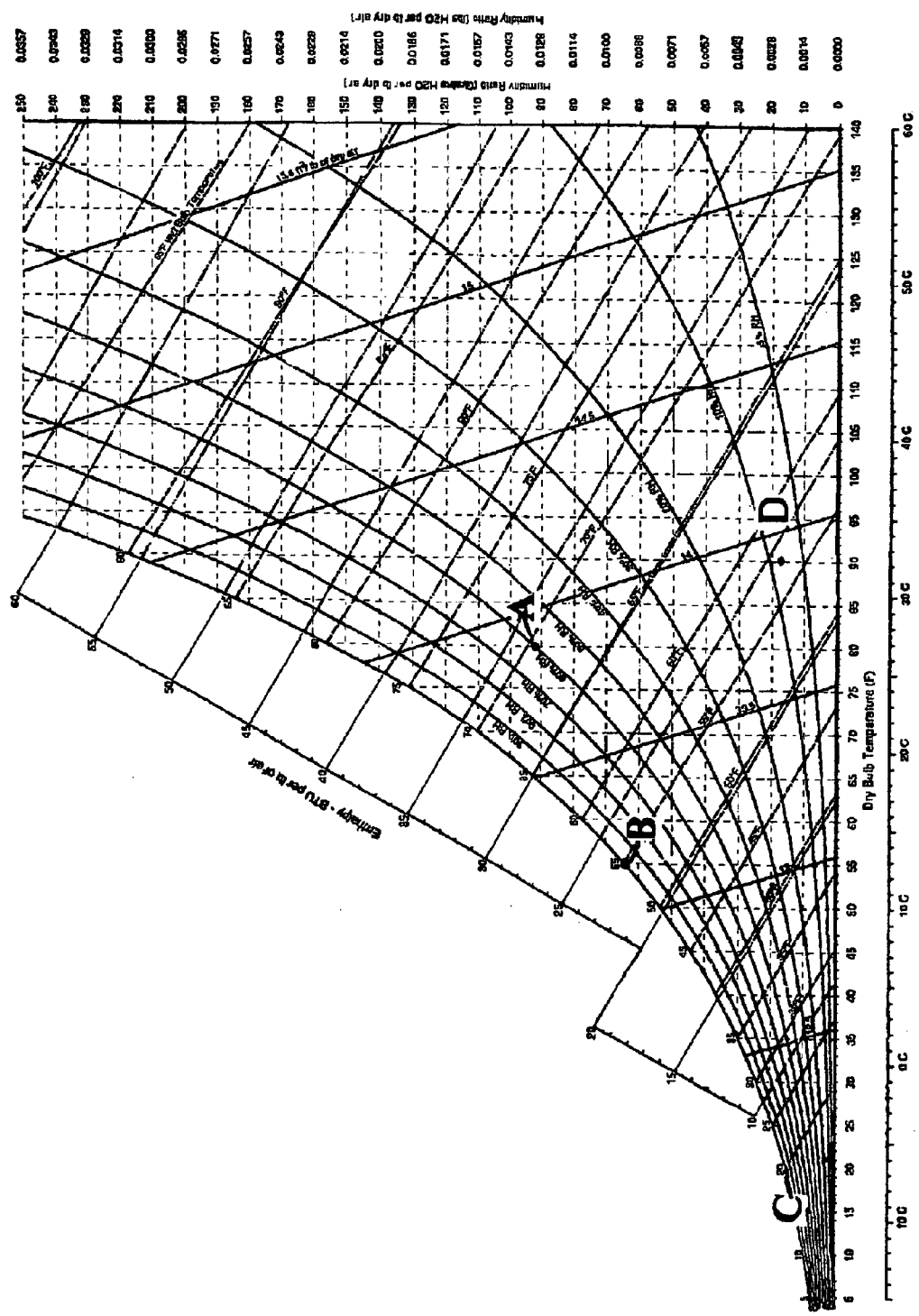
FIG. 2 is a standard psychrometric chart for water, with state points marked by alphabetic characters, illustrating selected information with reference to the detailed description of the invention.

Referring now to FIGS. 1 and 2, specific examples of operating parameters and conditions according to the invention will be described. As shown in FIG. 2, at state point A, when the dry bulb temperature of the air flowing in duct 11 upstream of first cooling element 14 is 80° F., with a relative humidity (RH) of 60%, 0.0132 pounds of water per pound of dry air will be present. Using this same FIG. 2, it can be determined that 13.90 cubic feet of air corresponds to one pound of air. By circulating three hundred cubic feet per minute (CFM) of air in air passage duct 11, twenty-one and one half (21.5) pounds of air per minute will be moving across the surface of the first cooling element 14. The amount of water vapor contained in this amount of air is 0.0132×21.5=0.28 pounds or nearly ⅓ pound of water per minute, which will be passing over first cooling element 14. The dew point for this condition is 64.9° F. By adjusting the suction pressure regulator 23, the circulating refrigerant in first cooling element 14 is set to operate, for example, at 40° F. It can then realistically be expected that a twenty-five degree drop in temperature will result and the air will be cooled to a temperature such as 55° F. when it passes over first cooling element 14.

At least a portion of the 0.28 pounds per minute of water vapor in this air will condense into liquid water upon the surface of first cooling element 14. This portion of water can be calculated by subtracting from the amount of water entering duct 11 which has been previously calculated to be 0.0132 lb./lb. of air. The amount of water available at the temperature the air was cooled to, shown at state point B where the air leaving the evaporator 14 is saturated or 99.9% RH, is 0.0092 lb./lb. This calculation indicates that only 0.004 lb./lb. is captured. Multiplying this number by 21.5 pounds of air per minute means that out of 0.28 pounds per minute that is available, only 0.086 pounds per minute is being captured. Continuing, from state point B where the dew point is 55° F., this saturated air is forced across the surface of second cooling means 15 which is controlled to operate at 0° F. (below the freezing point of water). As the moisture laden air makes contact, the moisture freezes upon the surface of the second cooling means 15 and the air is cooled to 20° F. This is represented as state point C on the psychrometric chart of FIG. 2, where it can also be seen that the amount of water is only 0.0021 pounds per pound of air at this point. A new calculation similar to the previous calculation reveals the amount of water captured is 0.0111 lb./lb., nearly all of what was available in the air upstream of the first cooling element 14. As the second cooling element 15 begins to accumulate ice, thereby restricting the flow of air through the enclosed circuit 11, the temperature of suction line 23 decreases. This temperature decrease is sensed by a temperature sensing switch 40 which closes, energizing a valve 19 which then opens and allows liquid refrigerant to pass through the second (a parallel connected) metering device 41. This connection has the immediate effect of an increase in pressure within the second cooling element 15. Therefore an immediate increase in temperature occurs and the ice on second cooling element 15 begins to melt. This method of defrosting is superior to a hot gas defrost method common in the art of refrigeration since it uses less moving parts and assures the surfaces of the cooling elements are always maintained below the dew point of 55° F. of the entering saturated air as well. As the ice melts, the temperature of second cooling element 15 begins to approach the temperature of the first cooling element 14. At this point, a temperature sensing switch device 40, sensing the increase in temperature, opens; de-energizing valve 19. Once again refrigerant is allowed to flow only through metering device 21, reducing the temperature of the second cooling element 15 substantially. The resultant water from the melted ice is collected in drain pan 24 and directed to storage vessel 25. The cooled air continues flowing through the duct 11 and is now directed across the surface of heating element 16 where the temperature of the air is raised to 90° F. This air is exhausted at port 31 as damper 18 is fully opened for this particular task, thereby obstructing the heated air from returning through the duct 11 to the air movement means 12.

Referring to FIG. 1 and FIG. 3, an alternate technique of water distillation at low temperatures is described. In this operation, damper 18 is fully closed, thereby creating a completely closed air circuit 11. As fan 12 forces air to move throughout the closed air passage duct 11, water in the form of a fine mist or fog is introduced into the air stream through a water introduction means 13 (for example, a spray nozzle or the like). This water need not be of a potable nature and can be brackish or salt water. A replaceable particulate filter 13a assures no foreign matter enters the introduction means 13. As this water is introduced into the circulating air in the form of a fine mist, there is an immediate effect known as adiabatic cooling. The term adiabatic refers to a change of state without loss or gain of heat energy. In this case, the adiabatic process refers to evaporative cooling. Evaporative cooling can occur when air passes over the surface of water. Even at temperatures well below the boiling point, water molecules at a surface will absorb sufficient energy from passing air to change phase into gas and become water vapor. As the water vapor is absorbed into the air, energy is transformed from sensible heat into latent heat of vaporization. Accordingly, the temperature of the air falls, and its absolute humidity rises, while the overall energy content remains the same. Thus, as the water spray makes contact with the air stream, adiabatic cooling takes place. The temperature of the air stream drops and the absolute humidity rises. A water entrainment means 17 positioned between the water introduction means 13 and the first cooling means 14 assures no droplets of water are allowed to pass beyond this point. If the temperature of the air stream was 90° F. before contact with the water, it is not uncommon for a twenty degree reduction in temperature to occur. Therefore, the new condition of the air stream is 70° F. and nearly completely saturated. This means that the dew point for this condition is near 70°. As in the previous example, the same phenomena occur. That is, the vapor laden air is driven by the fan 12 and passed across at least one surface of a first cooling element 14 which is maintained at a temperature below the dew point. The first cooling element 14 causes a portion of the vapor in the air to convert into liquid water. As the air passes the first cooling element 14, it is cooled to reach one hundred percent relative humidity. This is the customary condition for air after having passed over a refrigerant evaporator. At this point the air contains all of the moisture not captured by the first cooling element 14. The air stream is then passed across the surface of a second cooling element 15. The second cooling element 15 is operated at a temperature below the freezing point of water so that substantially all of the remaining water within the air stream is captured at the second cooling element 15. As the air stream passes beyond the second cooling element 15, it is again at one hundred percent relative humidity, though at a much cooler temperature. The air stream is then passed across a heating element 16 where the temperature of the air is drastically increased, simultaneously resulting in a significant drop in relative humidity. The air then returns through the insulated, enclosed ducted air passageway 11 to the fan 12 which forces the air through the cycle again, including the water injection or introduction step. This arrangement of adiabatic cooling, first and second cooling means, and air reheat, results in the capture of the greatest quantity of water possible in comparison to conventional techniques used for such tasks. Further, the task is accomplished with a significant decrease in energy usage, thereby resulting in higher efficiencies, with the result being a significant amount of captured water. By increasing the temperature from 20° F. leaving the second cooling element 15, to 90° F. by heating element 16, gives a new condition of 7.5% RH; extremely dry air with a great affinity for water. Since damper 18 is fully closed the air continues to circulate and again the method of moistening air, adiabatically cooling it, subjecting the adiabatically cooled air stream to multiple temperature evaporators thereby significantly drying it, then raising the temperature of the air stream creating an air stream of extremely low relative humidity, is performed in a continuously repeated cycle until the desired amount of water is collected. The water is stored in vessel 25 and subjected to filtering and disinfecting as is common in the art. In extremely hot and dry climates the damper may be adjusted to open to a certain degree during this operation thereby moderating the conditions within the refrigeration components.

Figure 4:
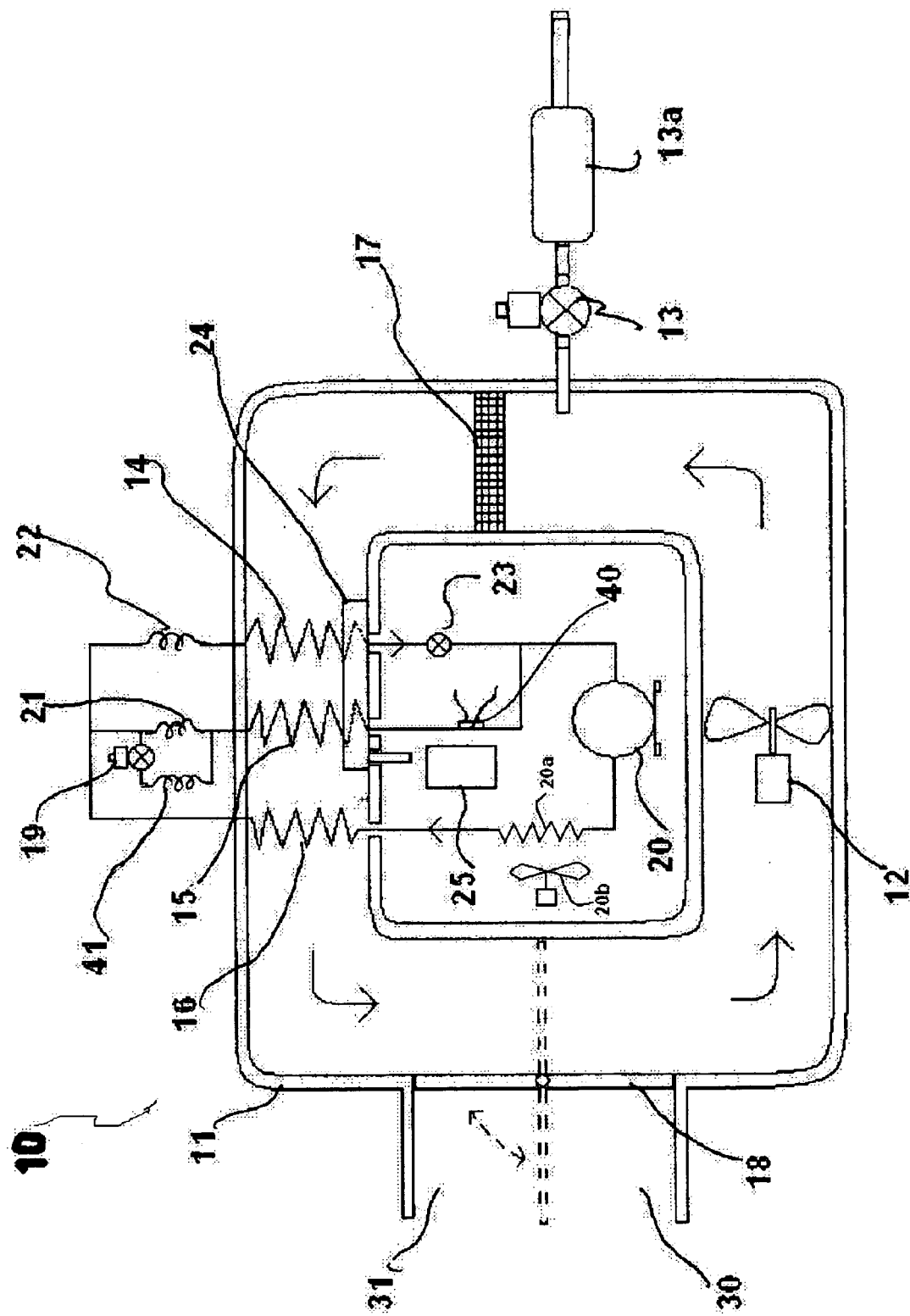
FIG. 4 is a schematic representation of an alternate embodiment of the invention illustrating air cooled desuperheating means.

Referring to FIG. 4, an alternate embodiment of the invention is shown in which means to pre-cool or de-superheat refrigerant supplied from a compressor 20 is illustrated. In general, the apparatus shown in FIG. 4 is substantially the same as that shown in FIG. 1 with the exception that air supplied by a further fan 20b disposed outside the enclosed air passage loop 11 is supplied across a condenser segment 20a to provide an air-cooled de-superheater which provides a somewhat similar effect on the circulating refrigerant as the water-cooled de-superheater shown in my U.S. Pat. No. 3,643,479 mentioned above.

Specifically, in FIG. 4, vapor compressor 20 is in fluid communication with air cooled de-superheater 20a. Refrigerant is caused to flow out of compressor 20 into de-superheater 20a where air supplied by a second air movement device (e.g. a fan) 20b, which is disposed outside of closed air loop 11, removes the superheat from the refrigerant. It has been found to be advantageous to use a controllable speed fan 20b in order to be able to further control the temperature of condenser 16 and thereby more accurately control temperature of the air within air duct 11. On-off time control of fan 20b similarly may be used to control air temperature within duct 11. De-superheated refrigerant then flows into condenser 16 where the remainder of the heat content is removed by the air flow within closed loop 11 passing over condenser 16. This causes the refrigerant to condense completely into liquid form. The liquid refrigerant passes through metering devices 41, 21, 22, as explained previously, into controlled temperature/pressure regions of evaporators 15 and 14, respectively, in order to collect and remove water supplied by water insertion means 13 from the circulating air within closed loop 11, again as explained above.

It can therefore be seen that FIG. 4 is similar to FIG. 1 in many respects and the same reference characters have been used in both figures to identify the same or similar parts.

Figure 5:
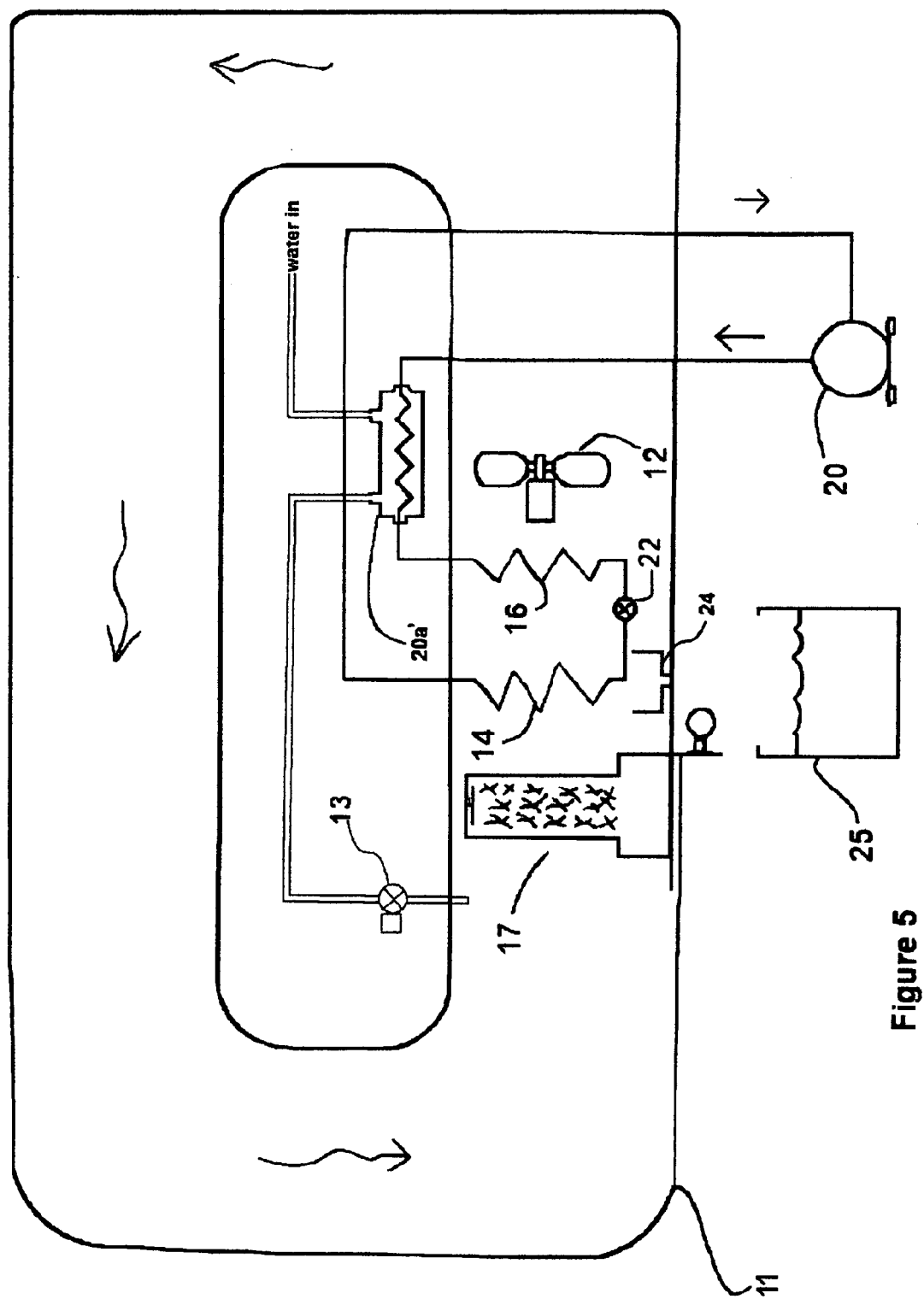
FIG. 5 is a schematic representation of a system similar in certain respects to that described in my U.S. Pat. No. 6,343,479, granted Feb. 5, 2002 and further adapted to take advantage of certain characteristics of the present invention.

Referring to FIG. 5, rather than the air cooled de-superheater arrangement 20a, 20b of FIG. 4, a similar function is provided by a water cooled de-superheater 20a' of the type shown in my earlier U.S. Pat. No. 6,343,479 mentioned above. The flow of cooling water for the de-superheater and its recovery is described in my '479 patent and is incorporated herein by reference. In the FIG. 5 arrangement, only a single evaporator element 14 is shown. However, it should be recognized that, as was mentioned previously, evaporator element 14 may, in fact, be a combination of evaporator elements 14 and 15, along with the associated control devices described in connection with FIG. 1. Furthermore, the coolant water circulated in de-superheater 20a' may be coupled to the water introduction means 13 to provide the desired water vapor in closed loop 11. In addition, all of the air-cooled de-superheater elements included in FIG. 4 may be coupled into the system shown in FIG. 5, with the elements 20a and 20a' being connected in series in the refrigerant path from compressor 20. In this way, the appropriate one of the de-superheaters may be operated while the other is not, according to the desired conditions of operation.

The aforementioned tasks of simple air to water conversion, as well as low temperature water distillation and desalination are all tasks which are well within the capabilities of the above described inventive combinations.

Accordingly, while one or more preferred embodiments of the present invention are illustrated and described herein, it will be understood the invention may be embodied otherwise than as herein specifically illustrated or described and that within the embodiments certain changes in the details of construction, as well as the arrangement of parts, may be made without departing from the principles of the present invention as defined by the appended claims.

What is claimed is:

1. Apparatus for extracting potable water from air comprising:
   a) a closed loop air passage duct;
   b) air movement apparatus disposed within said air passage duct for circulating air in a predetermined direction through said duct thereby creating a continuous flow of circulating air within said air passage duct;
   c) means for introducing water into said continuously circulating air flow to form water vapor so that upon evaporation of said introduced water, adiabatic cooling and an increase in absolute humidity of said air flow occurs downstream of said water introducing means;
   d) a first cooling element having a surface disposed within said duct down stream of said water introducing means, said first cooling element operating at a temperature at or below the dew point of said adiabatic cooled air flow, thereby causing collectible liquid water to form on said surface of said first cooling element as said continuous flow of air passes over said surface of said first cooling element; and
   e) first heating means disposed within said continuous air passage duct downstream of said first cooling element for increasing the temperature of said flow of air previously cooled by contact with the surface of said cooling element, thereby decreasing the relative humidity of said air flow as it is returned to said air movement apparatus.

2. Apparatus according to claim 1 and further comprising:
   a second cooling element having a surface disposed within said closed air passage duct between said first cooling element and said first heating means, whereby air leaving said first cooling element contacts a surface of said second element, said second element operating at or below the freezing point of water so that water vapor freezes on the surface of said element and forms ice.

3. Apparatus according to claim 1 wherein:
   said air leaving said first cooling element is saturated air.

4. Apparatus according to claim 2 wherein said means for introducing water is disposed within said air passage duct.

5. Apparatus according to claim 4 wherein:
   said means for introducing water provides non-potable water.

6. Apparatus according to claim 2 and further comprising:
   an adjustable air damper for selectively adding or exhausting a quantity of air to or from said air duct passageway.

7. Apparatus according to claim 3 and further comprising:
   means for entraining water droplets, said entraining means being positioned between said water introducing means and said first cooling means for causing water in vapor form to contact said first cooling means.

8. Apparatus according to claim 2 wherein:
   said first cooling element and said second cooling element are disposed within a single structure possessing the ability to function as said first and second cooling elements.

9. Apparatus according to claim 3 wherein:
   said first cooling element and said second cooling element are disposed within a single structure possessing the ability to function as said first and second cooling elements.

10. Apparatus according to claim 4 wherein:
    said first cooling element and said second cooling element are disposed within a single structure possessing the ability to function as said first and second cooling elements.

11. Apparatus according to claim 2 and further comprising:
    water collection apparatus associated with at least said first cooling element for collecting said collectible liquid water.

12. Apparatus according to claim 2 and further comprising:
    water collection apparatus associated with at least said second cooling element for collecting said collectible liquid water.

13. Apparatus according to claim 12 wherein:
    said water collection apparatus is associated with said first and said second cooling elements for collecting said collectible liquid water.

14. Apparatus according to claim 1 and further comprising:
    a de-superheater having a refrigerant circulating path in series with a refrigerant compressor and at least one of said cooling elements disposed within said continuous air passage downstream of said heating element.

15. Apparatus according to claim 14 wherein:
said de-superheater is at least one of a water cooled and an air cooled de-superheater.

16. Apparatus according to claim 14 wherein:
said de-superheater is water cooled and said cooling water is recovered in said apparatus.

17. Apparatus according to claim 1 wherein:
said cooling elements and said heating means are included in a refrigerant cycle.

18. Apparatus according to claim 16 wherein:
said cooling water for said de-superheater is recovered in said apparatus and is supplied to said means for introducing water.

19. A method of extracting potable water from air comprising:
circulating air in a predetermined direction along a closed flow path thereby creating a continuous flow of circulating air along said closed path;
introducing water into said continuously circulating air flow to form water vapor, such that upon evaporation of said introduced water, adiabatic cooling and an increase in absolute humidity of said air flow occurs;
providing at least a first cooling surface along said flow path down stream of said water introducing step and operating said cooling surface element at a temperature at or below the dew point of said adiabatic cooled air flow, thereby causing collectible liquid water to form on said cooling surface as said continuous flow of air passes over said surface; and
heating said air flow downstream of said cooling surface for increasing the temperature of said flow of air previously cooled by contact with said surface; thereby decreasing the relative humidity of said air flow as it is returned to the beginning of said closed flow path.

20. A method of extracting potable water from air according to claim 19 wherein:
said step of providing further comprises providing a second cooling surface downstream of said first surface and operating said second surface at or below the freezing point of water, thereby causing collectible water to form as ice on said second cooling surface.

21. A method of extracting potable water from air according to claim 20 and further comprising:
collecting water from said cooling surfaces.

* * * * *